United States Patent [19]

Chi

[11] Patent Number: 4,751,943

[45] Date of Patent: Jun. 21, 1988

[54] FAUCET STRUCTURE

[76] Inventor: James Chi, 91, Fu Hsing Rd., Sec. 3, Hsin Chuang, Taiwan

[21] Appl. No.: 923,737

[22] Filed: Oct. 28, 1986

[51] Int. Cl.$^4$ ................................................ F16K 1/44
[52] U.S. Cl. ................................. 137/625.31; 251/288
[58] Field of Search ................... 137/625.31; 251/174, 251/286, 287, 288, 304

[56] References Cited

U.S. PATENT DOCUMENTS

| 3,645,289 | 2/1972 | Schmitt | 177/625.31 X |
| 3,788,601 | 1/1974 | Schmitt | 251/288 X |
| 3,967,811 | 7/1976 | Keller | 251/288 X |

Primary Examiner—Gerald A. Michalsky
Attorney, Agent, or Firm—Holman & Stern

[57] ABSTRACT

The present invention relates to an improved faucet structure which is changing the conventional manner of vertical, up-and-down, spiral control of turning on and off water flow into the novel manner of plane rotary control, the entire opening and closing of the faucet can be achieved via rotating about 90° thereof. Therefore, the operation is much more convenient and laborsaving as well as durable and practical than ever before since the rubber washer subject to more even force is uneasy to be damaged.

1 Claim, 5 Drawing Sheets

FIG·3

FAUCET STRUCTURE

BACKGROUND OF THE INVENTION

Nowadays the conventional faucet structure and the water flow control manner thereof are shown in FIG. 1 and 2. Generally speaking, it is making use of the action of up-and-down, vertical and spiral displacement of a screw (2) in a valve seat (1) so that the valve body (3) and washer (4) at the bottom end of said screw (2) may press to close or release the water flow outlet (6) in the faucet (5) and to achieve the control over turning on or off the water faucet flow. However, the design of said faucet structure leaves much to be desired and thus cannot develop the effect of convenience and duration. These drawbacks are hereby analyzed and described hereinafter:

1. So far as the design of conventional faucet structure is concerned, when control over turning on or off the water faucet flow, the knob (7) has to be rotated to actuate the up-and-down displacement action of screw (2). Therefore, to turn on of off the faucet each time has to rotate the knob (7) for a plurality of revolutions to entirely turn on or off same, it is rather troublesome and inconvenient to operate the knob (7).

2. As mentioned above, when control over turning on or off the water faucet with a conventional structure, the knob (7) has to be rotated to actuate the up-and-down displacement action of screw (2), and the water flow outlet 9() in the faucet (5) is pressed to close or release through the valve body (3) and washer (4) at the bottom end of screw (2). Therefore, the force required to rotate and press the knob (7) will vary with the operator, and if the washer (4) is subject to an uneven force, it may lead to faucet breakage and water leakage.

3. Since the water flow control of turning on or off the conventional faucet in making use of rotating the screw up and down, the unequal force to rotate it tends to skip the screw and further not to complete the entire locking and closing of faucet.

This inventor who has engaged in manufacturing various water faucets for a number of years, in view of that the effect of convenience and duration of structural design of conventional faucet to control the water flow through turning on or off the faucet leaves much to be desired, has continuously and positively proceeded with experiment, research and reform, obtained a number of results therefrom, and eventually developed a convenient, durable, practicable improved water faucet structure.

SUMMARY OF THE INVENTION

An improved faucet structure is characterized by changing the manner of vertical, up-and-down, spiral control of turning on and off water flow through a flow resistant device in the faucet into the manner of about only 90° plane, rotary displacement to cover the water flow outlet, so that it is time-saving and convenient to fully turn on and off the faucet and uneasy to damage the rubber washer subject to uneven force. It is designed to make the faucet much more durable and practicable than ever before.

BREIF DESCRIPTION OF THE DRAWINGS

FIG. 2 is a section view of the structure of conventional faucet when turning on.

DETAILED DESCRIPTION OF THE PREFERRED EMBODIMENT

Figure 1:
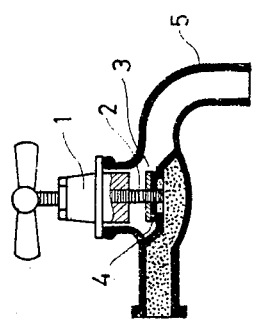
FIG. 1 is a section view of the structure of conventional faucet when turning off.
Figure 2:
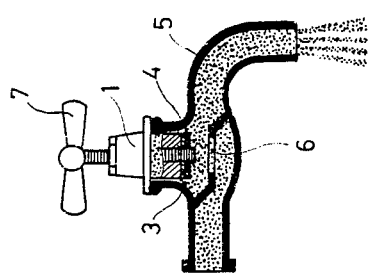
Figure 3:
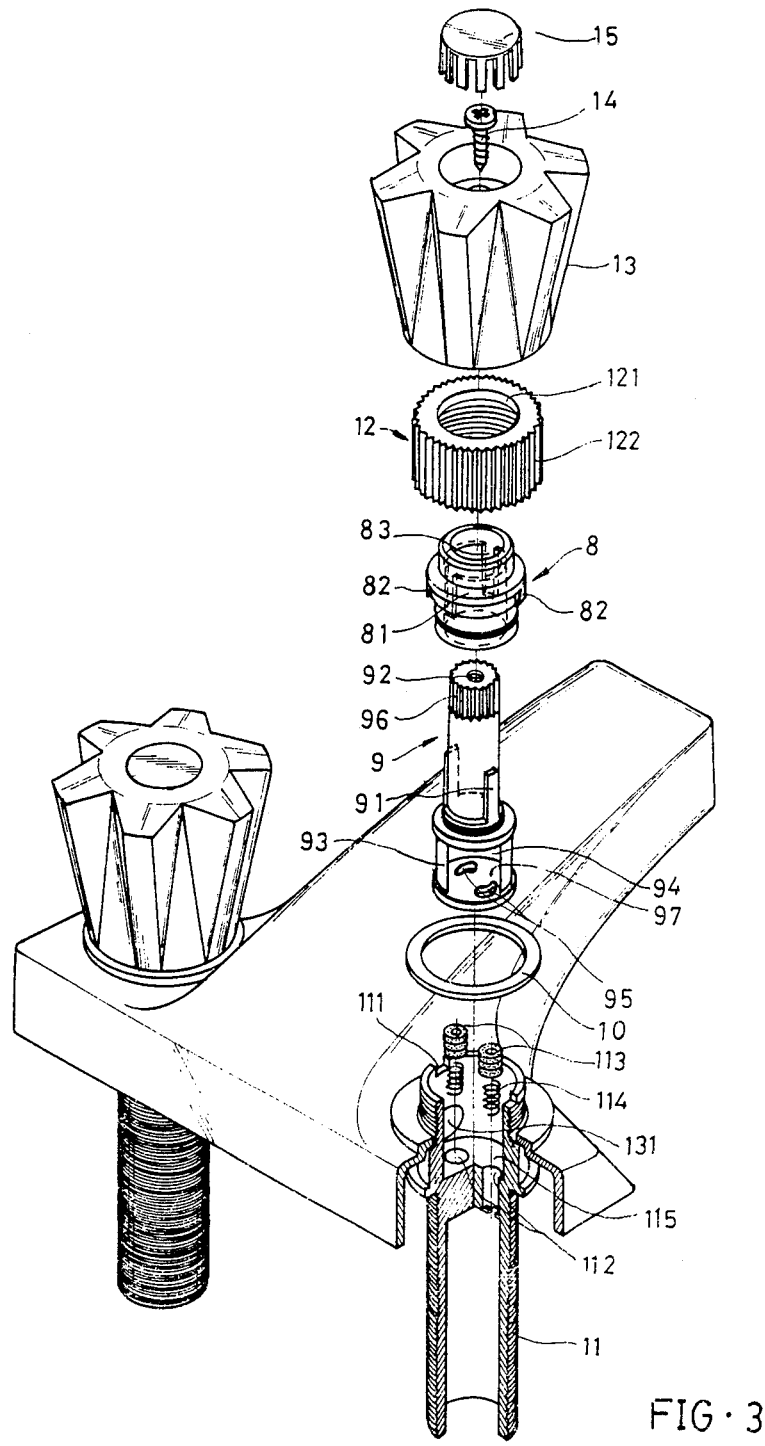
FIG. 3 is a breakdown view of the faucet structure of the present invention.

As shown in FIG. 3, the faucet of the present invention consists of a valve seat (8), a rotary rod (9), a washer (10), a water source connecting pipe (11), a screw enclosure (12), a faucet knob (13), a screw (14) and a snap member (15), wherein the valve seat (8) is provided with an annular outer flange (81) and two projected blocks (82) on its outer edge surface and with two opposite projected pillars (83) on its inner edge surface, so that each half of said inner edge surface can be equally divided into two spaces of about 90° respectively. Two opposite projected pillars (91) are provided to the outer edge surface of rotary rod (9) so that each half of said outer edge surface can also be divided into two spaces of about 90° respectively, a screw hole (92) is provided to the center on the top end surface of said rotary rod (9), a valve body (93) with an opening (94) is provided to the bottom end of said rotary rod (9), and two opposite notches (95) are provided to the bottom surface (97) of said valve body (93). Two opposite notches (111) are provided to the edge surface of an opening at the top end of water source connecting pipe (11), two water inlets (112) are provided to the section (115) in the said pipe (11), and a washer (113) and a compression spring (114) are installed in the said water inlets (112) respectively, so that the washer (113) in the water inlets (112), when being pressed by the bottom surface (97) of rotary rod (9), has a reserved compressible and elastic clearance; the screw enclosure (12) has a smaller opening at its top surface than an opening at its bottom surface, and a screw side (121) with a projected stop is provided to the said top surface; the faucet knob (13) is installed on the engagement teeth (96) on the top surface of rotary rod (9) and the engagement teeth (122) on the outer edge surface of screw enclosure (12) after all the foregoing members are assembled together.

Figure 4:
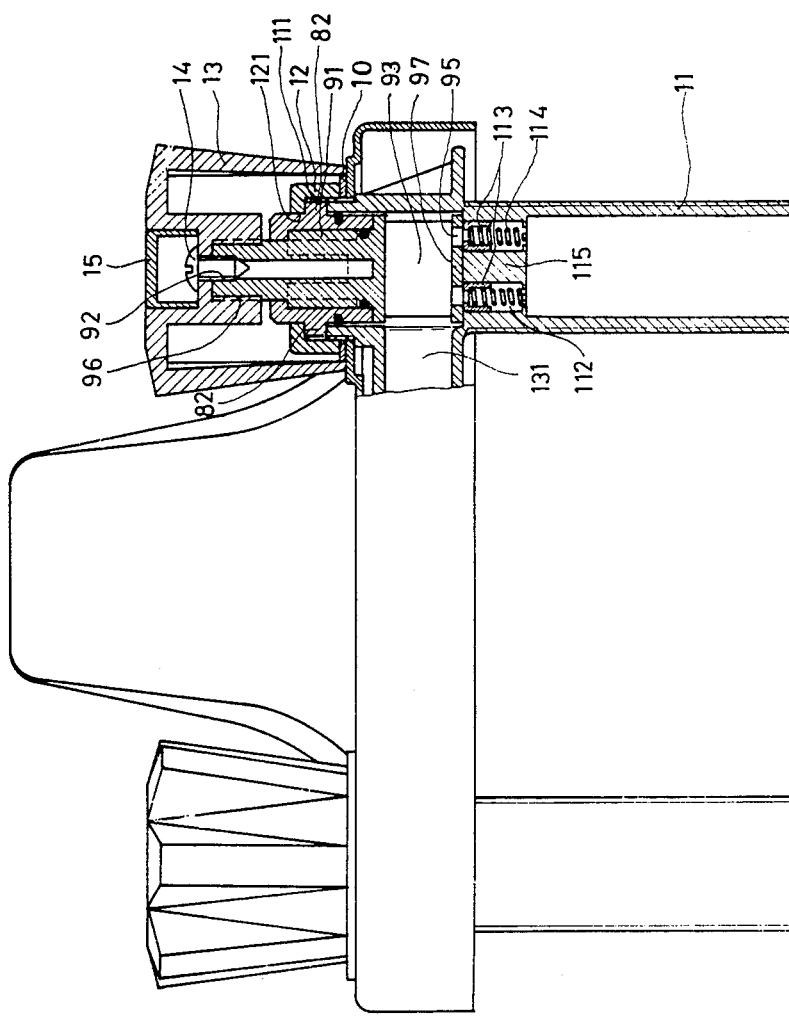
FIG. 4 is a section view of the faucet assembly of the present invention.
Figure 5:
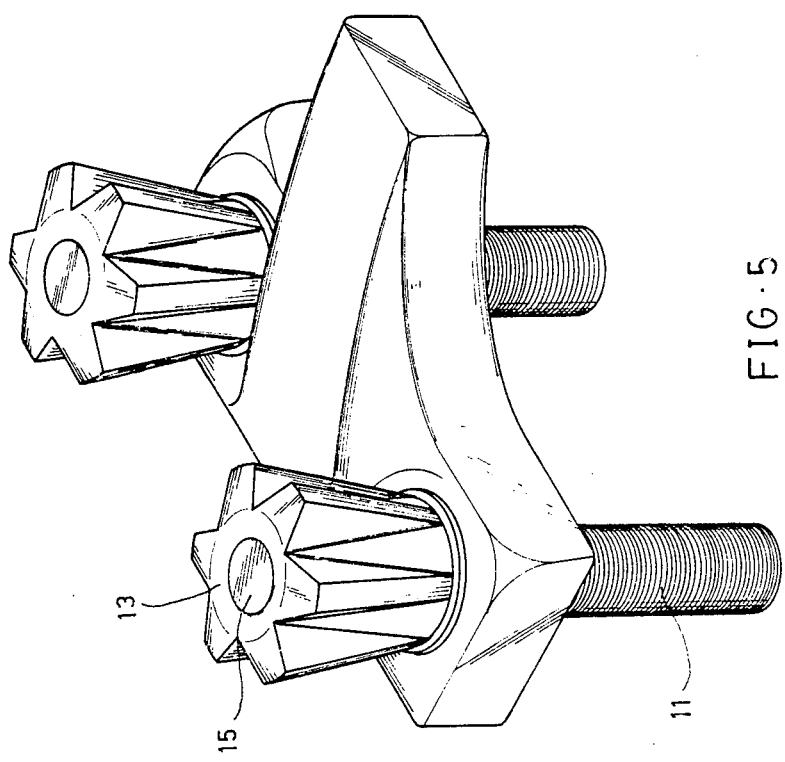
FIG. 5 is an appearance view of the faucet assembly of the present invention.

The assembly and operation of the present invention can be best described in reference to the accompanying drawings. As shown in FIG. 4, when assembly, all to do is to insert the rotary rod (9) in the valve seat (8) to make both of them into one body (so that the two projected pillars (91) on the rotary rod (9) will be on the inner edge surface of valve seat (8), meantime, if the rotary rod (9) is rotated within the scope of 180°, the said two projected pillars (91) will be stopped by the two projected blocks (82) on the inner edge surface of valve seat (8); in reality, the leftward and rightward rotary displacement magnitude of said rotary rod (9), after deducting the width, i.e. angular magnitude, occupied by the two projected blocks (82) on the inner edge surface of valve seat (8), is only about 90°; then to insert the assembled rotary rod (9) and valve seat (8) in the water source connecting pipe (11), to make the two projected blocks (82) on the outer edge surface of valve seat (8) exactly corresponding to the two notches (111) at the top end of said pipe(11), to install the screw enclosure (12) on the rotary rod (9) and valve seat (8) and said pipe (11), so that the screw side (121) at the top end of screw enclosure (12) can gradually press down the outer flange (81) on the outer edge surface of valve seat (8), the two projected blocks (82) on the outer edge surface of valve seat (8) can enter into the two notches (111) at the top end of water source connecting pipe (11) to position the valve seat (8) without rotation leftward or rightward; meantime, the rotary rod (9) is moved down to let its bottom surface (97) strictly press the section (115) in the said pipe (11) (when the two notches (95) on the bottom surface (97) subject to the rotation of rotary rod (9) align partially to the two water inlets (112) on the section (115) of said pipe (11), the faucet is turned on; on the contrary, when the two notches (95) on the bottom surface (97) do not entirely align to the two water inlets (112) on the section (115) of said pipe (11), the faucet is turned off). Finally, the faucet knob (13) is installed on the engagement teeth (96) (122) on the outer edge surface of rotary rod (9) and screw enclosure (12), and the snap member (15) is installed on the said knob (13) through a screw (14), the assembly of the present invention is then finished (as shown in FIG. 5).

Figure 7:
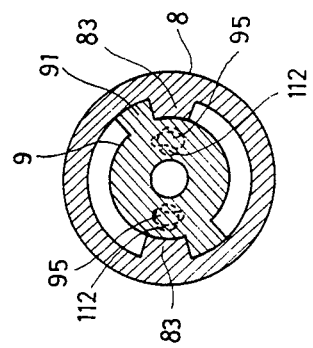
FIG. 7 is an optional view of rotary angle between the rotary rod and the valve seat in the faucet of the present invention when turning on the water flow under control.
Figure 6:
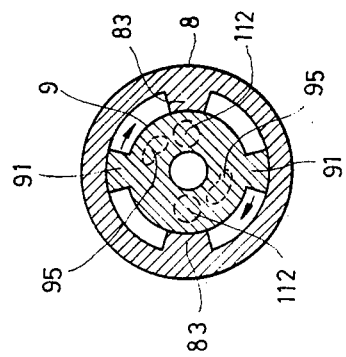
FIG. 6 is an optional view of rotary angle between the rotary rod and the valve seat in the faucet of the present invention when turning off the water flow under control.

When in operation, all to do is to rotate the faucet knob (13) so as to actuate the rotary rod (9) to rotate and to let the two notches (95) on the bottom surface (97) of rotary rod (9) partially or entirely align to the two water inlets (112) on the section in the water source connecting pipe (11) (Only the rotate the faucet knob (13) for about 90° can achieve the required entire alignment thereto), so that the water flows from the two water inlets (112) on the section (115) in the water source connecting pipe (11) to the two notches (95) on the bottom surface (97) of rotary rod (9), then to the opening (94) at the bottom end of rotary rod (9), and to the opening (131) of faucet connector and then out of the faucet opening. When turning off the faucet (namely, let the two notches (95) on the bottom surface (97) of rotary rod (9) not entirely align to the two water inlets (112)), it only has to rotate the faucet knob (13) for about 90° reversely. When turning on or off faucet entirely, it only has to rotate the faucet knob (13) for about 90° leftward or rightward (as shown in FIGS. 6 and 7). Such an operation for use of this invention is very simple and convenient.

In view of the above, it is foolproof that the primary object of this invention is to offer a novel faucet structure which is characterized by capable of entirely turning on and off the faucet through only rotating the faucet knob for about 90°.

The secondary object of this invention is to offer a much more durable and practicable faucet which is characterized by the manner of plane rotary displacement to cover the water flow outlet during the control process of turning on and off the water flow, so that the washer is always subject to a more even force, i.e. the rotary force will never vary with the operator.

Another object of this invention is to offer a zero-defect faucet which is characterized by entirely eliminating the drawback of conventional faucet incapable of controlling the water flow as a result of screw skip through the said manner of plane rotary displacement to cover the water flow outlet during the control process of turning on and off the water faucet.

In summary, this invention with the foregoing outstanding features is a novel structural design of faucet with a considerable practical value and duration. However, what is mentioned above shows only an example which is easier to be put into practice but never to limit this invention. Various changes, modifications and applications of this invention with equivalent efficiencies made by those who are skilled in this art without departing from the spirit and scope of this invention remain included in the scope of claims of this invention.

I claim:

1. An improved faucet structure comprising a valve seat, a rotary rod, a washer, a water source connecting pipe, a screw enclosure capable of locking the valve seat and rotary rod onto the water source connecting pipe, and a faucet knob capable of actuating the rotation of the rotary rod, wherein: the valve seat is provided with an annular outer flange and two projected blocks on its outer edge surface, and with two opposite projected pillars on its inner edge surface so that each half of said inner edge surface can be equally divided into two spaces of about 90° respectively;

the rotary rod is provided with two opposite projected pillars on its outer edge surface so that each half of said outer edge surface can also be divided into two spaces of about 90° respectively in gear with the two projected pillars on the inner edge surface in the valve seat for rotation, a screw hole is provided at the center on the top end surface of said rotary rod, and a valve body with an opening therein is provided at the bottom end of said rotary rod with two opposite notches being provided at the bottom surface of said valve body; and the water source connecting pipe is provided with two opposite notches on the edge surface of an opening at its top end, two water intlets being provided on a section in the said pipe, and a washer and a compression spring being provided in each of the said water inlets so that the washer, when being pressed by the bottom surface of said rotary rod, can reserve a compressible elastic clearance.

* * * * *